Jan. 31, 1928.
C. E. WEIR
1,657,947
TRACTOR TRUCK
Filed Dec. 15, 1924    3 Sheets-Sheet 1
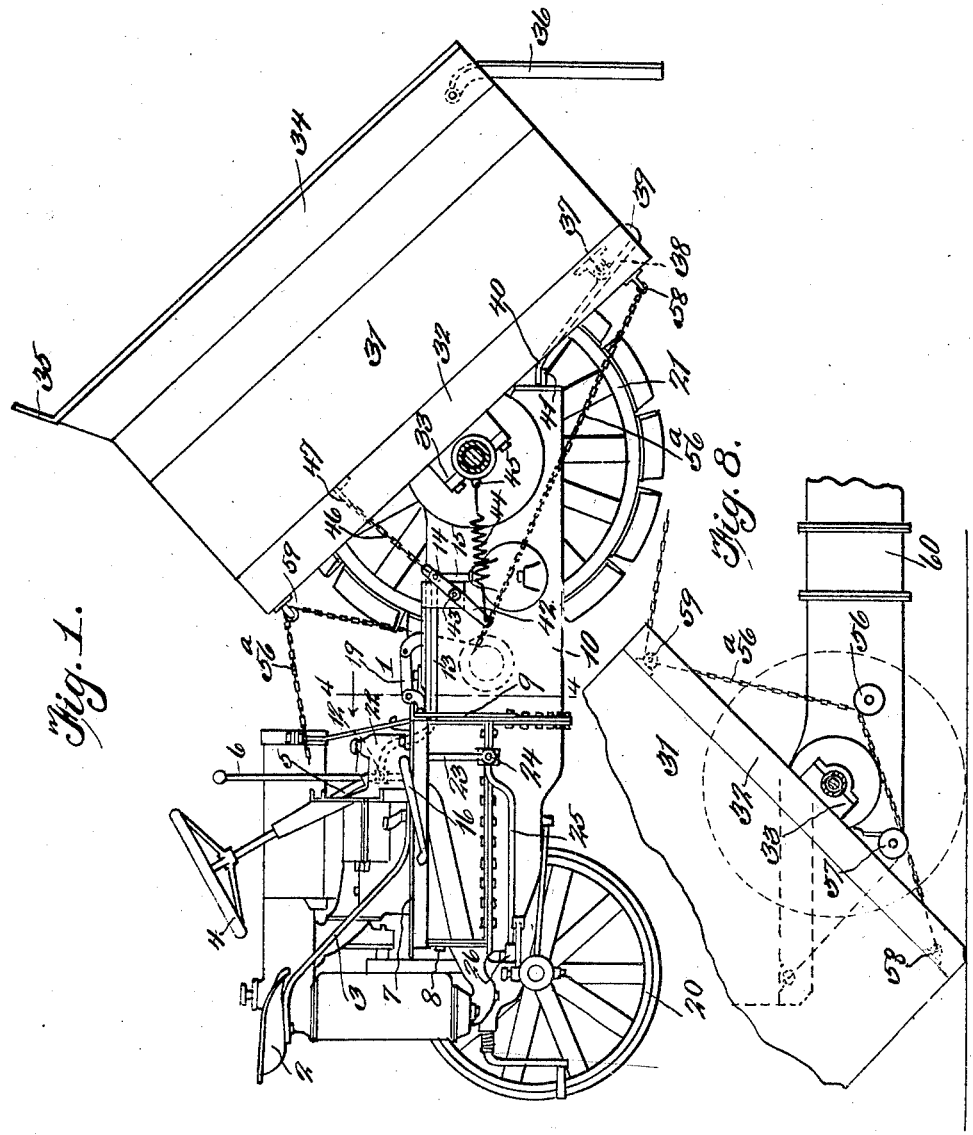
Inventor
C. E. Weir Jan. 31, 1928.
C. E. WEIR
1,657,947
TRACTOR TRUCK
Filed Dec. 15, 1924
3 Sheets-Sheet 2
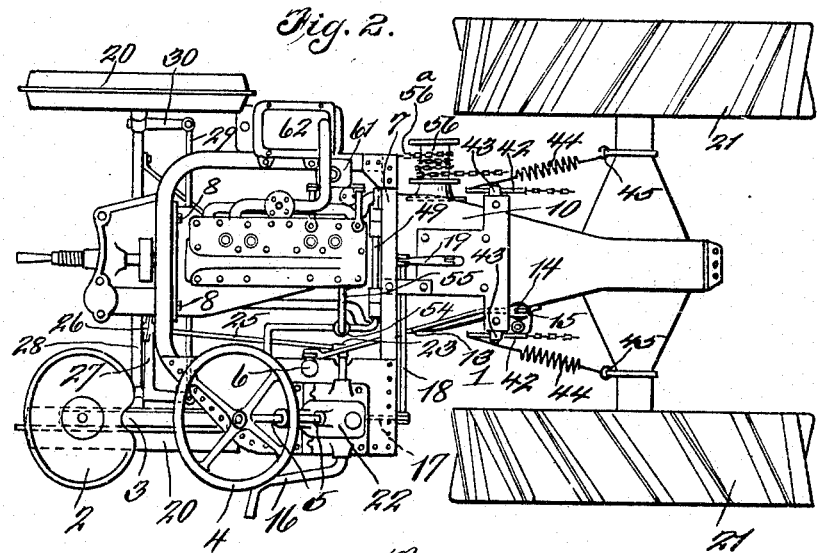
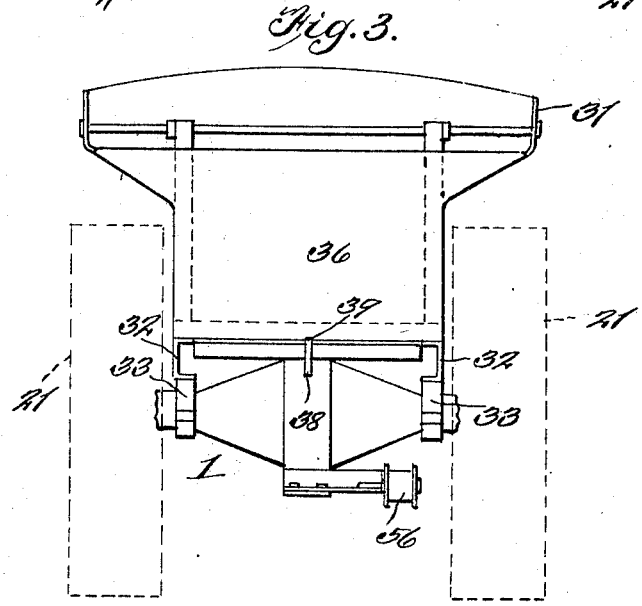
Inventor
C. E. Weir Jan. 31, 1928.
C. E. WEIR
1,657,947
TRACTOR TRUCK
Filed Dec. 15, 1924   3 Sheets-Sheet 3
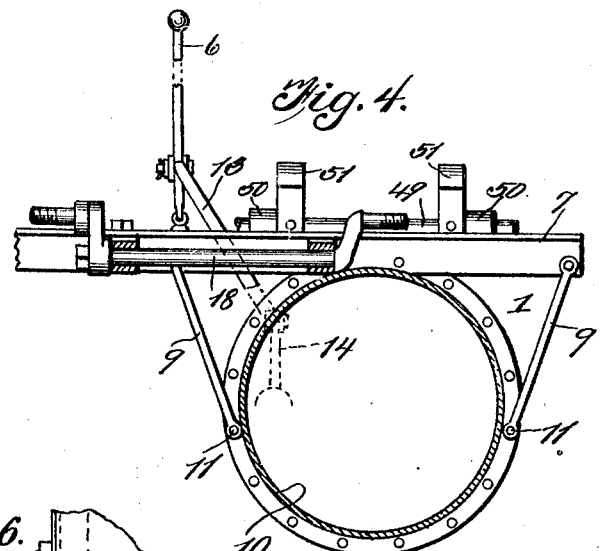
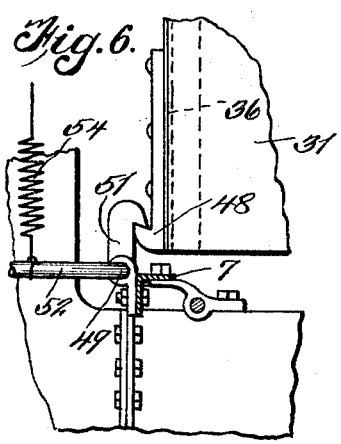
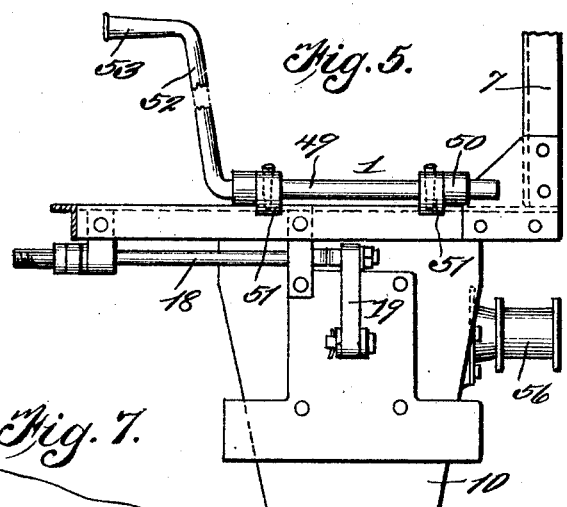
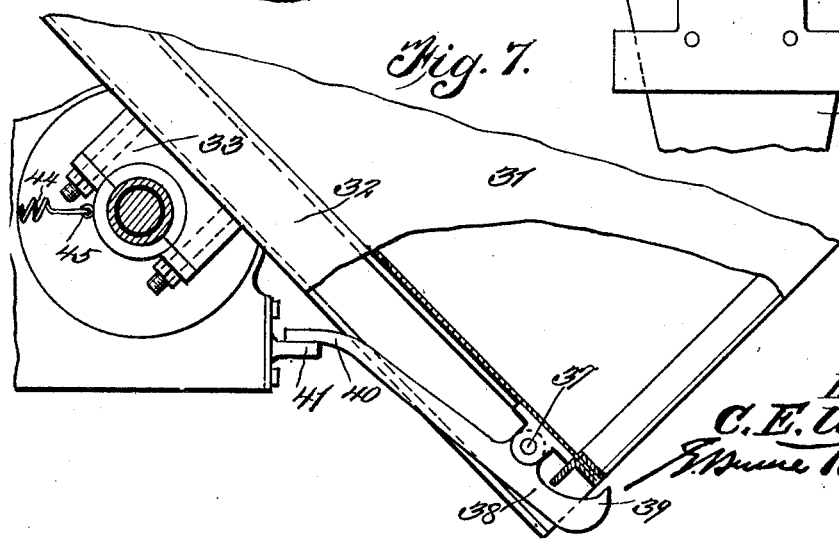
Inventor
C. E. Weir Patented Jan. 31, 1928.

1,657,947

UNITED STATES PATENT OFFICE.

CARL EMBERSON WEIR, OF OLIVET, SOUTH DAKOTA.

TRACTOR TRUCK.

Application filed December 15, 1924. Serial No. 756,083.

It is the purpose of the present invention to provide, in a tractor truck, a construction especially adapted for use in connection with elevating graders for carrying off dirt and the like, especially when grading roadbeds and other places, such as fields, foundations and the like.

Heretofore it has been customary to use teams which are adapted to be positioned under the elevator of a grader to receive the dirt, but in this method the wheels of the wagon are very apt to get stuck in the dirt, especially when the surface is extremely muddy or when the excavating and loading are being conducted immediately subsequently to wet weather.

Another purpose is to provide a construction for the purpose of converting the now well known Fordson tractor into a tractor truck, the idea being to change the positions of the steering wheel and the operator's seat as well as the complete control mechanism for controlling the tractor, so that they are operable from the radiator end of the tractor and to place in the locations previously occupied by these mechanisms a truck body whereby the excavated material may be received, carried off and dumped without the sticking of the wheels in the mud.

Still another purpose is to provide means for pivotally supporting the truck body in a position over the crank case of a Fordson engine, whereby the body may be tilted to a dumping position.

A further purpose is to provide means for actuating the truck body to a tilted position for dumping and means for returning the body to a supported position, together with means for retaining the body in such supported position, all of these mechanisms being controllable from the operator's seat which, in the present instance, has been changed to a location over the front wheels of the tractor. In this case, the tractor is operated rearwardly and all the operable parts of the tractor are capable of being controlled by the driver whose seat is positioned over one of the front wheels of the tractor.

A still further purpose is the provision of a tail gate which may tilt to facilitate the dumping of the contents of the body.

Also, the invention aims to provide a platform constructed in a shape to surround the engine, with means for attaching it for the purpose of supporting the operator's seat and the steering means, there being tensioning means connected to the axle casing and, in turn, to the body to prevent the body from tipping over too far and arrest the body in its movement without jar or damage thereto, said tensioning means also assisting in returning the body to a horizontal position.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in elevation of a Fordson tractor with certain of the supporting wheels removed and the construction of the tractor being partially reorganized, reformed and repositioned to permit of the support of a tiltable truck body, showing the body tilted and the tail gate swung open.

Figure 2 is a plan view of the tractor truck with the truck body removed showing the location of the operator's seat, steering wheel and other parts of the machine mounted on the platform.

Figure 3 is a front view of the tractor truck showing the body in full lines and the forward drive wheels in dotted lines.

Figure 4 is a sectional view through the transmission case on line 4—4 of Figure 1, showing the platform in edge elevation supported upon the transmission case.

Figure 5 is an enlarged plan view of a part of the transmission case and the platform showing the means for releasing the truck body and the clutch operating means.

Figure 6 is a detail view of the holding catch for the truck body.

Figure 7 is an enlarged detail view of the releasing means for the tail end gate of the truck body.

Figure 8 is a view of a part of the engine case with the truck body in a tilted position and showing a chain for operatively tilting the body.

Referring to the drawings, 1 designates the tractor as a whole. Ordinarily the operator's seat of a Fordson tractor is mounted over the crank case of the engine and between the rear drive wheels. Also the steering wheel ordinarily projects upwardly and rearwardly and assumes a position to be operated by the driver. The same thing is true with reference to the controlling mechanism for the tractor. However, in the present instance, these conditions are reversed in that the operator's seat 2 is mounted upon a support 3 rising from a location between the front wheels and the steering wheel 4 and its column 5 are mounted so that the wheel may be controlled readily by the operator. The transmission control lever 6 also extends to a position within easy reach of the operator whose seat rises from a location adjacent the front wheels.

In order to mount the operator's seat, a platform 7 consisting of steel plates and angle iron is constructed in a shape to surround the engine, as shown clearly in the plan view of Figure 2. This platform acts as a support for the seat, the steering wheel and the releasing means for the catch for the truck body. This platform is attached to the engine case at one end by timing gear case cap screws 8 and at the other end by stays 9 which are secured to the transmission or engine case 10 by means of the bolts 11.

The controlling lever is pivotally supported as shown in Figures 1, 2 and 4, and connected thereto, as at 12, is a link 13 which connects at 14 to the controlling gear shifting lever proper 15. Also the clutch controlled foot lever 16 is mounted upon the platform and an arm 17 thereof is fast to a shaft or rod 18 to one end of which a link 19 is connected. This link, in turn, connects in the usual manner (not shown) with the clutch. The pedal end of the lever 16 is positioned so as to be within easy reach of the operator's foot.

A Fordson tractor converted in this manner permits the operator to face the direction in which the tractor is traveling though it may be traveling rearwardly. In other words, the wheels which are ordinarily the front steering wheels constitute the rear steering wheels 20 and the ordinarily used rear tractor wheels act as front wheels 21. As the operator faces the direction in which the tractor is traveling, it is as easy to steer the machine as it is when steering the tractor in its original direction.

The steering wheel column 5 passes through a housing 22 mounted upon the platform and operatively connects in any suitable manner (not shown) with an arm 23. This connection (not shown) is contained in the housing. The arm 23 is, in turn, connected at 24 to a link 25 which operatively connects at 26 with one arm of a bell crank 27 which is carried in the usual manner with the knuckle joint between the stud axle (not shown) for the rear wheel and the axle 28. The other arm of the bell crank 27 is connected by a link 29 with an arm 30 of the knuckle joint of the opposite wheel 20. In this manner the rear wheels 20 may be turned in either direction for steering the tractor.

A suitable truck body 31 is provided and carried by the opposite sides thereof are channel irons 32 upon which bearings 33 are mounted, as shown in Figures 1 and 3. The bearings 33 are provided for the purpose of receiving the axle housing or casing of the Fordson tractor so that the truck body may be mounted between the ordinary rear wheels which are, in the present instance, the front wheels. The truck body is of a conventional construction including the upper inclined side and end boards 34 and 35 although the body is provided with a pivoted or hinged tail gate 36 which may tilt downwardly to permit of the discharge of the contents of the body. In other words, the body tilts through the medium of gravity, that is, when released, and when tilted, as shown in Figure 1, the tail gate swings by gravity to an open position.

Pivoted at 37 on the bottom of the truck body is a latch 38, the lug 39 of which engages the tail gate when closed to hold the gate in such position. The lug 39 of the latch remains in engagement with the tail gate through the medium of gravitation of the end 40 of the latch, that is, when the body is in a horizontal position. However, when the body tilts, the gravitating end 40 of the latch contacts with the usual hinge attaching lug 41 which is carried by the tractor and when engaged with the lug, the latch 38 tilts, removing the lug 39 from the path of the tail gate, allowing it to swing open, as shown in Figure 1.

Levers 42 are fulcrumed at 43 on the side of the crank case and connected to certain of the arms of these levers are springs 44 which, in turn, are connected at 45 to the bearings of the truck body. Certain other of the arms of the levers are connected to chains 46 which, in turn, are fastened to angle members 47 attached to the bottom of the truck body. It will be noted that when the truck body tilts due to the weight of the load as well as due to the operating means, the springs 44 are put under tension, thereby preventing the truck body from tipping over too far and at the same time arresting the body in its tilting movement without jar or damage to the body. These springs also assist in returning the truck body to its horizontal position.

The rear end of the truck body has keepers 48 and mounted in bearings 50 of the platform is a rock shaft 49 and movable with the shaft are latch arms 51, the teeth of which engage with the keepers 48 to retain the truck body in a horizontal position. One end of the rock shaft has a crank arm 52 terminating in a foot-piece 53. A suitable spring 54 connects to the crank arm 52 and holds the latch arms normally in vertical position. The spring 54, in turn, connects to a suitable support 55 projecting from the engine block. By depressing the foot-piece and rocking the shaft 49, the latch arms disengage from the keepers and permit the truck body to operate.

Mounted on the side of the transmission case and driven in any suitable manner (not shown) by the engine shaft is a pulley 56 about which a chain, rope or the like 56ª is wound sufficiently to cause sufficient friction thereon to operate the chain when it is taut, and when it is slack it is allowed to slip relative to the pulley. The chain passes over a pulley 57 carried by the end of the crank case and has its end attached at 58 to the under part of the truck body. The other portion of the chain passes over a pulley 59 on the bottom of the truck body at the opposite end and is terminally anchored. In fact, the end of the chain adjacent the operator may be supported in any well known manner so that the operator may grasp the chain and hold it taut. Obviously, through the medium of the drive shaft of the engine, the pulley 56 will impart movement to the chain to assist in tilting the truck body, in fact, start the tilting movement. A reverse movement of the drive shaft of the engine will operate the chain to return the body to its initial position against the action of the springs 44. However, the operator may pull upon the chain and return the body to its initial position.

In Figure 8, a modified construction of the crank case is disclosed and it consists in a method for increasing the wheel base of a Fordson tractor by inserting a casting 60 between the engine and the transmission cases. Obviously, by installing a longer drive shaft (not shown) between the clutch and transmission gears, it is possible to increase the distance between the front and rear wheels and enable a much larger truck body to be mounted on the tractor and in this way increase the capacity of the truck.

It is obvious that any other form of means for dumping the truck body may be employed.

The gasoline tank 61 and the air filter 62 are positioned to that side of the engine remote from the driver.

A tractor truck of this character readily obviates the binding of the wheels of other forms of trucks, teams and the like due to the fact that the tractor drive wheels may easily operate over soft or muddy ground or road-beds. A machine of this character may be operated easily by one man and may be driven under the upper end of an elevator of a grading machine to receive the dirt as it is excavated and when loaded the tractor truck may be driven to a location for the dumping of the material.

The invention having been set forth, what is claimed is:

1. In combination with a tractor, a truck body pivotally mounted on the drive axle of the tractor, an engine driven pulley carried by the tractor, and a flexible member terminally secured respectively to the rear end of the truck body and to the tractor and having a running engagement with the forward end of the truck body, with an intermediate portion arranged in several convolutions around said pulley.

2. In combination with a tractor, a truck body pivotally mounted on the drive axle of the tractor, an engine driven pulley carried by the tractor, and a flexible member terminally secured respectively to the rear end of the truck body and to the tractor and having a running engagement with the forward end of the truck body, with an intermediate portion arranged in several convolutions around said pulley, said flexible member being normally slack for manual tension to effect gripping action on said pulley.

3. In combination with a tractor, a truck body pivotally mounted on the drive axle of the tractor, an engine driven pulley carried by the tractor, and a chain having one end secured to the truck body on the under side at the forward end of the latter and the other end anchored to the tractor, a guide pulley over which an intermediate portion of the chain is trained being secured on the under face of the truck body at the rear end and the chain being wound in several convolutions around said engine driven pulley.

In testimony whereof he affixes his signature.

CARL EMBERSON WEIR.